US011159404B1

(12) United States Patent
Kuo et al.

(10) Patent No.: US 11,159,404 B1
(45) Date of Patent: Oct. 26, 2021

(54) DEFINITION SCHEMA FOR DEVICE CAPABILITIES

(71) Applicant: Amazon Technologies, Inc., Seattle, WA (US)

(72) Inventors: Calvin Yue-Ren Kuo, Mercer Island, WA (US); Shiwei Ni, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 15/861,432

(22) Filed: Jan. 3, 2018

(51) Int. Cl.
| | | |
|---|---|---|
| *G06F 15/173* | (2006.01) | |
| *H04L 12/26* | (2006.01) | |
| *H04L 29/08* | (2006.01) | |
| *H04W 8/22* | (2009.01) | |
| *H04L 12/24* | (2006.01) | |
| *G06F 16/21* | (2019.01) | |

(52) U.S. Cl.
CPC .......... *H04L 43/065* (2013.01); *H04L 67/104* (2013.01); *H04L 67/1008* (2013.01); *H04W 8/22* (2013.01); *G06F 16/211* (2019.01); *H04L 41/50* (2013.01); *H04L 67/32* (2013.01)

(58) Field of Classification Search
CPC . H04L 43/065; H04L 67/1008; H04L 67/104; H04L 67/32; H04L 41/50; H04W 8/22; G06F 16/211
See application file for complete search history.

(56) References Cited

U.S. PATENT DOCUMENTS

| | | | | |
|---|---|---|---|---|
| 8,788,944 | B1* | 7/2014 | Gill | G06F 8/61 715/744 |
| 9,055,120 | B1* | 6/2015 | Firman | G06Q 30/0623 |
| 2003/0217179 | A1* | 11/2003 | Famolari | H04L 29/12047 709/245 |
| 2010/0274714 | A1* | 10/2010 | Sims | G06Q 20/102 705/40 |
| 2014/0089531 | A1* | 3/2014 | Bhogal | G06F 9/4411 710/8 |
| 2015/0381403 | A1* | 12/2015 | Venaglia | H04W 4/50 709/220 |
| 2019/0349426 | A1* | 11/2019 | Smith | H04L 67/104 |

* cited by examiner

*Primary Examiner* — John B Walsh
(74) *Attorney, Agent, or Firm* — Davis Wright Tremaine LLP (57) ABSTRACT

A technology is provided for identifying computing capabilities of a device. A query may be sent to a device to request capabilities data regarding capabilities of the device. The capabilities data may be received from the device regarding the capabilities of the device. The capabilities data may be stored as a definition schema in a data store. The definition schema may be used to manage distributed logic at the device.

20 Claims, 8 Drawing Sheets

DEFINITION SCHEMA FOR DEVICE CAPABILITIES

BACKGROUND

Electronic devices have become ever-present in many aspects of modern society. During the course of a normal day, many people may use a smart phone, a tablet device, a laptop computer, a desktop computer, devices with embedded logic, and other computing devices. Mobile devices have also become widely used whether for personal use, business use, or institutional use. Some computing service providers have begun offering centralized, virtual computing options known as service provider environments that may reduce overall costs, improve availability, improve scalability, and reduce time to deploy new applications. Mobile devices and other electronic devices may be able to access the service provider environments to provide additional functionality and services to the applications being provided.

Advancements in communication technologies have allowed for even relatively simple electronic devices to communicate with other devices and computing systems over a computer network. Computing networks or service provider environments may also communicate with resource constrained devices, such as Internet of Things (IoT) devices. Resource constrained devices may have varied capabilities. Applications designed for this environment may be more effective when the applications are able interact (e.g., share information) with applications or computing logic on other devices.

DETAILED DESCRIPTION

Technologies are described that may identify the capabilities of a device and store the capabilities as a definition schema. The device may be a device with limited capabilities such as an Internet of Things (IoT) device. IoT devices may be deployed in in many forms and may have varied capabilities or architecture. The varied capabilities may cause difficulties in deploying or executing distributed logic across a large number of these devices in a network. The generation of the definition schema may allow a device to exchange the definition schema with other devices or send the definition schema to other devices or to a computing hub associated with the device. The definition schema may describe the hardware and software capabilities of the device. The definition schema may also describe services that are available from the device. In addition, the definition schema may be stored in a data store associated with the computing hub.

The definition schemas from a fleet of devices may be employed to deploy distributed logic to the fleet of devices where the devices have different capabilities from one another. The computing hub, another device, or a service may send the definition schema to other devices associated with the device or to other computing hubs. The computing hub, another device or a service may use the definition schema to determine or identify an application compatible with the device. A notification may then be sent to a user or other device that such an application is available. For example, the device may be a motion sensor or camera. The definition schema may be used to identify that an application is available that will allow the data from the camera of the device to be shared or displayed on a monitor that is associated with or is in a network or group with the device.

The computing hub, another device or a service may use the definition schema to identify that a first device has capabilities in common with a second device. Thus, a second device may be processing a load and the first device may then be used to distribute the load between the first device and the second device based on the common or intersecting capabilities identified in the definition schema. In addition, the definition schema may also be used to manage access to the device based on a list of authorized devices determined using the definition schema.

The definition schema may be generated based on capabilities data received at the computing hub from the device. For example, the computing hub may query the device requesting capabilities data about the capabilities of the device. The query may be a script sent to the device from the computing hub that the device executes to generate the requested capabilities data. Alternatively, the requested capabilities data may be permanently recorded (e.g., burned) into the device at the time of manufacture and may be provided to the computing hub upon request. Further, the capabilities data may be obtained from the manufacturer. For example, the computing hub may receive a unique identifier from the device and then use the unique identifier to look up the capabilities data from a data store associated with the manufacture.

Figure 1:
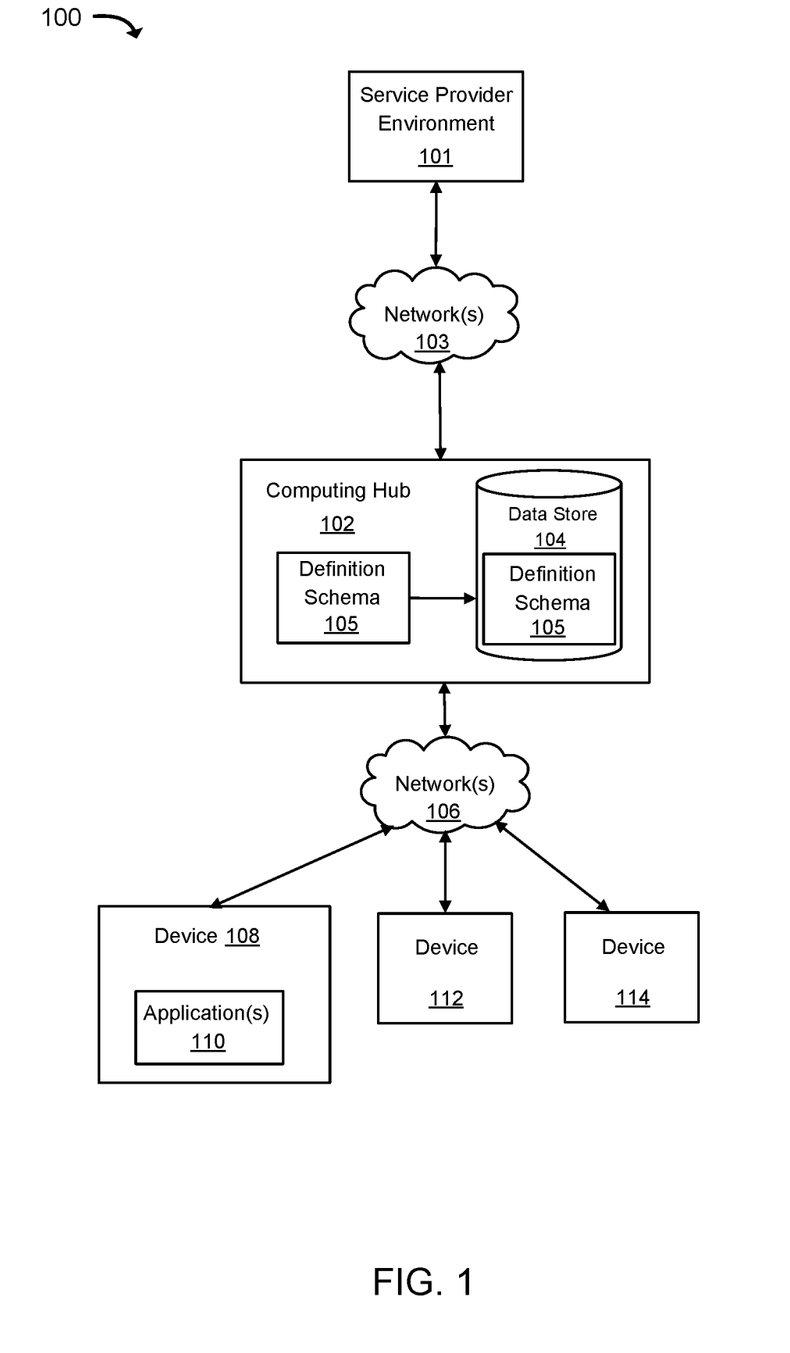
FIG. 1 is a block diagram illustrating a computing hub connected to devices and a data store according to example embodiments of the present technology.

FIG. 1 illustrates an environment 100 including a computing hub 102 that is a device designed to manage other devices, such as device 108, device 112, and device 114 that may be deployed in a computing network (e.g., a local network). The devices may be described as computing nodes in the environment 100. For example, the computing hub 102 may be deployed in a building (e.g., commercial building, industrial building, or residential building) or other structure and may manage local IoT devices such as smart locks, smart thermostats, video cameras, displays, etc. The device 108, device 112, and device 114 may be peer nodes in an environment and may have different capabilities than one another. The device 108, device 112, and device 114 may be devices with limited capabilities and, in some cases, may not be able to exchange capabilities data with another device regarding respective capabilities. These devices 108, 112, 114 may communicate with one another and the computing hub 102. The communications may occur directly or may be routed through a wired or wireless network 106. The network 106 may be a local network created using an access point such as a wireless router or the network 106 may be a wired network. Alternatively, the network may be a wide area network (WAN). IoT devices, such as the device 108, device 112, and device 114, may be any type of home automation devices, factory automation devices, farm automation devices, transportation devices, vehicles, medical devices, energy management devices, sensors, actuators, embedded electronic devices, or other devices.

The service provider environment 101 may be described as a plurality of computing systems or services employed to provide centralized and virtualized computing services accessible to devices, applications, or other services via a network 103 (e.g., the internet). In one aspect, the service provider environment 101 may be connected to the computing hub 102 via the network 101.

The device 108 may include an application 110 which is logic executing on the device 108. The application may be an independent application or the application may be part of a distributed application or distributed logic. The application 110 may allow the device 108 to offer a service or the application may be associated with the software capabilities of the device 108. The software capabilities of the device 108 may also refer to software capabilities of the device 108 provided by an operating system or firmware executing on the device 108.

The device 108 may also provide hardware capabilities that may be use of shared by other devices 112, 114. The hardware capabilities of the device may refer to the physical components or resources of the device 108. For example, a hardware capability of a device 108 may be the type of processor and the speed of the processor of the device 108. Alternatively, the hardware capability may be a sensor associated with the device 108. The capabilities of the device 108 may also refer to the physical architecture of the device 108. The hardware capabilities of the device may also refer to hardware peripherals or components that may be available. For example, the device 108 may have the capability to perform hardware compression or transcoding for other devices.

The computing hub 102 may request capabilities data from the device 108 about the capabilities of the device 108 to use in generating or creating a definition schema. The capabilities data may be described as being transformed into the definition schema. The request may be a query or some other type of messaging request (e.g., an API call). The capabilities of a device may be related to hardware, software, services available, or the physical architecture of the device. The computing hub 102 or another component may send a network message to the device 108 to request the capabilities data. In one configuration, the computing hub 102 may send a script to the device 108 to execute. The script may cause the device 108 to generate the capabilities data requested by the computing hub 102. For example, the script may have a checklist of attributes or capabilities that is used to determine whether or not the device 108 has each of the attributes or capabilities in the checklist. In another example, the script may have a list of functions the device may attempt to execute.

In one specific configuration, the script may be configured such that the device 108 outputs the capabilities data in JavaScript Object Notation (JSON) format. The JSON format may use attribute-value pairs. For example, a capability of the device 108 may be paired with an attribute in JSON format. Alternatively, the script may be configured such that the device 108 outputs the capabilities data in a bitmap format. When the capabilities data is in the bitmap format, each bit in the bitmap may represent the existence or the absence of a software or hardware feature, and the meaning of each bit may setup in a pre-defined schema in advance. A definition schema 105 may be generated at the computing hub 102 using the capabilities data to indicate what the device 108 is capable of. The definition schema may be generated by reformatting, compressing or otherwise transforming the capabilities data. The definition schema 105 may then be sent to the data store 104.

A device or service other than the computing hub 102 may request the capabilities data from the device 108 to generate a definition schema. The definition schema may be generated by a component of the service provider environment 101. For example, a service or computing instance executing in the service provider environment 101 may request the capabilities data from the device 108. The capabilities data may then be used by the requesting service or computing instance to generate the definition schema and store the definition schema in a data store associated with the service provider environment 101. The definition schema may then be sent to other computing instances, devices, computing hubs, or data stores.

Alternatively, the device 108 may be built with capabilities data regarding the capabilities of the device 108 fixed or burned into memory or storage of the device 108. For example, the manufacturer of the device may burn or permanently store the capabilities data into the device at the time of manufacture. Alternatively, the device 108 may have a unique identifier that may be obtained by the computing hub 102 and then used by the computing hub 102 to obtain the capabilities data.

In one aspect, the device 108 already has a definition schema stored in memory and is sent to the computing hub 108. A definition schema already stored in the device 108 may be reformatted by the computing hub 102 or other component. The definition schema may be stored in a data store 104. The definition schema may be formatted in the JSON format, an XML (extensible markup language) format, a comma delimited format, a flat file or another pre-defined format. The computing hub 102 may reformat the definition schema after it has been created. The data store 104 may be a database located in the computing hub 102. The data store 104 may be internal or external to the computing hub 102. The data store 104 may be physically proximate to the computing hub 102 or may be located in a remote location and accessed by the computing hub 102 via a network.

The computing hub 102 may send the definition schema to the device 108 such that the device 108 may exchange the definition schema with other devices or may send the definition schema to another computing hub. When the device 108 sends the definition schema to another device such as device 112, the device 112 is then able to use the definition schema to discover the capabilities of the device 108. The device 112 may also send a definition schema to the device 108 to enable the exchange of definition schemas between the devices. The computing hub 102 may also send the definition schema to another computing hub, a computing system (physical or virtual), or a computing service, or code function.

Figure 2:
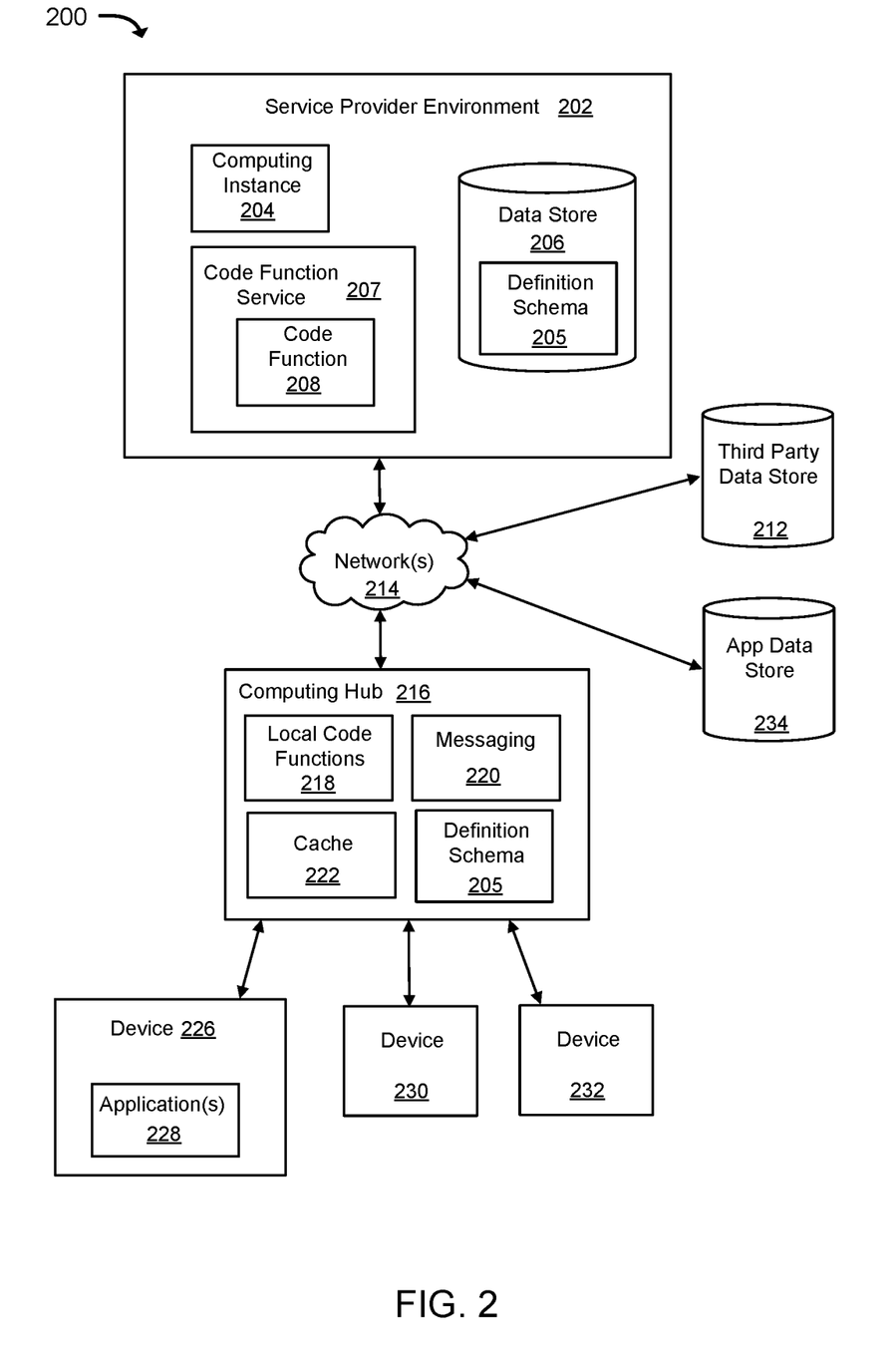
FIG. 2 is a block diagram illustrating a computing hub connected to a device and a service provider environment according to example embodiments of the present technology.

FIG. 2 illustrates an environment 200 including a service provider environment 202, a definition schema 205, a computing hub 216, and a device 226. It should be appreciated that the computing hub 216, data store 206, device 226, application 228, device 230, and device 232 may have similar features and capabilities as the computing hub 102, the data store 104, the definition schema 105, the device 108, the application 110, the device 112, and the device 114 respectively of FIG. 1.

The computing hub 216 may be employed to obtain capabilities data regarding the capabilities of the device 226. The capabilities data may then be used by the computing hub 216 to generate a definition schema regarding the device 226. The definition schema may be stored at a data store associated with the computing hub 216. In another configuration, an application on a computing instance 204 may be used to request and the definition schema for the device 226 and the data schema may be stored in a data store 206 of the service provider environment 202. The definition schema may be sent to the device 226 and may be exchanged by the device 226 with the device 230 or the device 232. The device 230 or the device 232 may discover capabilities of the device 226 and use this information to interact with the device 226. Alternatively, the definition schema may be generated with the capabilities data collected at the device using components of the service provider environment 202, such as the computing instance 204, rather than by the computing hub 216.

The service provider environment 202 may be described as a plurality of computing systems or services employed to provide virtualized computing services accessible to devices, applications, or other services via a network 214 (e.g., the internet). In one aspect, the service provider environment 110 may be in network communication with the computing hub 216 and to device 226, device 230, and device 232 via the network 214.

The service provider environment 202 may also host a computing instance 204, a code function 208, and/or data store 206. The computing instance 204 may be a virtualized resource (e.g., a virtual computer or server). The data store 206 may be an object data store such as a NoSQL data store, a relational data store, an object data store or another type of data store.

The definition schema may also describe whether the device 226 is compatible with a given or a specific code function 208. For example, the code function 208 may require specific capabilities for a device that is to invoke the code function 208. If the device 226 is capable of invoking the code function 208 or is otherwise compatible with the code function 208, then the definition schema may list or describe such an ability as a service that is available using the device 226. In one aspect, the code function 208 may be able to query the device 226 for capabilities data and the code function 208 may be employed to generate the definition schema 205 for the device 226. The code function 208 can then distribute the definition schema 205 to the device 226, the computing hub 216, and/or other entities. The code function 208 may be launched using the code function service 207 that manages the code function 208 and receives triggers designed to launch the code function 208. In one aspect, the code function 208 outputs the definition schema 205 in JSON format. The code functions 205 in the computing hub 216 may also operate similarly.

In one aspect, the computing hub 216 may be employed by the device 226 to execute a code function from the local code functions 218 stored by the computing hub 216. The definition schema may indicate whether the code function 218 may be invoked by the device 226 using the computing hub 216. Based on the compatibility of the device 226 with the code function 208, software may be available to the device 226 that uses both the features of the device 226 and the code function 208.

The code function 208 may be a function that launches in a container on a computing instance in the service provider environment 202 and is a segment of program code that is capable of receiving parameters, performing processing, and returning values. The code function 208 may also be called a "program code", "compute service code", or "compute service program code." In one aspect, the code function 208 may execute on a managed compute service code platform for back-end web services, such as code function service 207, that runs a defined code function on the computing instance. That is, the code function may execute in a compute service that runs code in response to requests to execute the code function 208, and automatically manages the compute resources used by the code function 208. This may result in what may be called serverless computing. Once the code function 208 has been executed and the appropriate results have been returned, the code function 208 and results may be flushed from memory of the computing instance or container in which the code function was executing. The code function 208 provides for building smaller, on-demand applications that may be responsive to requests, events and new information. For example, the code function 208 may be used to automatically provision back-end services triggered by custom code function requests. In one aspect, the code function 208 may be triggered in response to a request or an event, may execute or perform a function in response to the request or event, and may return a response or value.

The computing hub 216 may be a computing device with a processor, memory, and network connectivity (e.g., a wireless connection) for communication with the device 226. The compute hub 216 may include local code functions 218 which include instructions for the compute hub 216 to execute. The local code functions 218 may be similar to compute code functions that may be executed in a compute service in the service provider environment 202 but these functions are available to execute at a local device such as the device 226 without accessing the service provider environment 202. For example, one or more computing instance and/or containers may be provided in the compute hub 216, and the local code functions 218 or compute code functions may execute using a compute service in the compute hub 216. The local code functions 218 or compute code functions may be portions of code that can be executed locally using the compute service at the request of the device 226, and return results may also be provided to the device 226. The local code functions 218 may be functions that launch in a container on a computing instance executing on the compute hub 216 and are segments of program code that is capable of receiving parameters, performing processing, and returning values. In addition, the local code functions 218 are terminated at the compute hub 216 once the local code functions 218 return values. The local code functions 218 may be employed to request capabilities data from the device 226 related to the capabilities of the device 226. The local code functions 218 may include a script to the send to the device 226.

Capabilities data received from the device 226 may be stored in a cache 222 at the computing hub 216. The capabilities data stored in the cache 222 may then be employed by the computing hub 216 to generate the definition schema. The computing hub 216 may also include a messaging module 220 that is employed to receive messages from the service provider environment 202 and send the messages to the devices 226, 230, and 232. For example, the service provider environment 202 may include a messaging service that pushes messages to the messaging module 220 of the computing hub 216. The messaging module 220 then pushes the messages to the device 226. The messages may be used to initiate an update or install distributed logic at the device 226. The actual logic or application may be downloaded from the service provider environment 202 or from the computing hub 216.

The definition schema may be employed by the computing hub 216 to identify applications available to the device 226. For example, the local code functions 218 may be used to analyze the definition schema to determine software that is already installed at the device 226, software available to the device 226 from the service provider environment 202, and software that may be used in conjunction with other devices associated with the device 226 such as the device 230 and the device 232. The local code functions 218 may identify software available to the device 226 that makes use of raw data generated by the device 230. For example, a first device may have a capability that a second device does not have and the capability may make use of raw data generated by the capabilities of the second device. In a specific example, the second device is a smart thermostat that generates temperature data for a room. The first device may be capable of opening or closing window coverings for a window in the same room. The available application may be for the first device to open and close the window coverings based on the temperature data generated by the second device.

Software available to the device 226 may refer to software that is able to be installed on the device 226 based on the hardware capabilities of the device 226. The available applications or software may be freely available to use on the device 226 or may be available to purchase. In addition, applications or other software may be available to the device 226 based on a license available to the owner of the device 226. Software that is available to the device 226 may be obtained by the device 226 or the computing hub 216 from an app data store 234. The app data store 234 may be a third party data store that is located within or without the service provider environment 202. In one aspect, the app data store 234 may be described as an app store for obtaining or purchasing apps or software from a third party. In one aspect, the app data store 234 is owned by an entity that also owns the device 226 and the app data store 234 is a private repository for storing software for devices.

In one aspect, a user or user account may access the computing hub 216, and the computing hub 216 may have collected the definition schemas from a plurality of devices associated with the user. The computing hub 216 may send notifications to the user regarding software available to a devices in communication with the computing hub 216 such as the device 226. The notification regarding the software available may be based on capabilities data from the definition schema.

In one example aspect, the computing hub 216 or computing instance 204 may analyze a group of devices associated with one another and determine a deficiency in the group. A recommendation based on the deficiency may then be made to a user associated with the group. For example, the deficiency may be that the group lacks a device with display capabilities. The recommendation may then be for the user to purchase or add a device to the group with display capabilities. The recommendation may be for a device type that would be compatible with the existing devices in the group. The device type may be compatible with the existing devices in the group where compatibility is determined based on the capabilities data in the definition schemas for the existing devices that were analyzed.

The definition schema may be employed to identify features or capabilities of the device 226 that are in common with another device. For example, the device 226 may be identified to have the same or nearly the same processing capabilities as the device 230. For example, the device 230 may be processing a load (e.g., encryption, transcoding or some other compute intensive service). Based on the common capabilities shared by the device 226 and the device 230, the load that is being processed by the device 230 may be shared with the device 226. This may be referred to as load balancing. The local code functions 218 of the computing hub 216 may be employed to identify the common capabilities. Two devices with common computing capabilities may be described as devices with intersecting capabilities. The two devices may be similar devices, the same type of devices, the same class of devices, or the two devices may be heterogeneous devices that are different from one another but have intersecting computing capabilities. The definition schema 205 may be employed by a matching service that matches capabilities or functions between two devices that are shared in common by an application or share common capabilities. The matching service may be hosted in the computing hub 216, the computing instance 204, or the code function 208.

In one aspect the definition schema 205 may be employed to discover or identify opportunities to improve an application associated with the device 226. For example, the definition schema 205 may be used to discover that a given application is not compatible with a device, but a developer may easily modify the given application to make the given application compatible with the device 226. In a different example, the definition schema 205 may be used to identify that an installed application at the device 226 does not utilize a particular capability of the device 226 that is identified in the definition schema 205. The installed application may then be modified or updated to make use of the particular capability of the device 226.

The computing hub 216 may request capabilities data from the device 226 regarding the capabilities of the device 226. The capabilities data may be used to generate a definition schema. In one aspect, the computing hub 216 request a unique identifier from the device 226 that identifies that identifies the device 226 capabilities or device type. The identifier may identify a make, a model, serial number, or hardware identifier of the device 226. The unique identifier may be burned or stored in a memory of the device 226 by the manufacturer of the device 226. The unique identifier may be used by the computing hub 216 or the computing instance 204 to look up capabilities data regarding the capabilities of the device 226. For example, the capabilities data may be found in a third party data store 212. The third party data store 212 may be a data store associated with the manufacturer of the device. The third party data store 212 may be contain capabilities data about the device 226 such as the hardware components or peripherals of the device, firmware or software installed on the device 226 at the time of manufacture, and the physical architecture of the device.

In one aspect, the definition schema describes or lists authorizations for user accounts or other devices that are allowed to access the device 226. For example, a first device (device 226) may be a printer and a second device (device 230) may be allowed to access the printing features of the device 226 but a third device (device 232) may not be authorized to access the printer. The device 226 may be managed by the computing hub 216. For example, the definition schema may include a list of security features that control security of the device 226. The definition may list what devices or user accounts have access or authorizations to use particular capabilities of the device 226. The computing hub 216 then uses the definition schema for the management and allows device 230 to print, but does not allow another device 232 to print using the device 226 based on the permissions or authorization described in the definition schema. Alternatively, the device itself may manage the security of the capabilities that other devices may attempt to access. For example, the definition schema may represent what devices, device classes, or security group the device may allow access to the device's capabilities. In one aspect, the device 226 may be associated with a group of devices. The definition schema may list the group that the device 226 is associated with. The membership in the group may be used by the computing hub 216 to manage the device 226.

Figure 3:
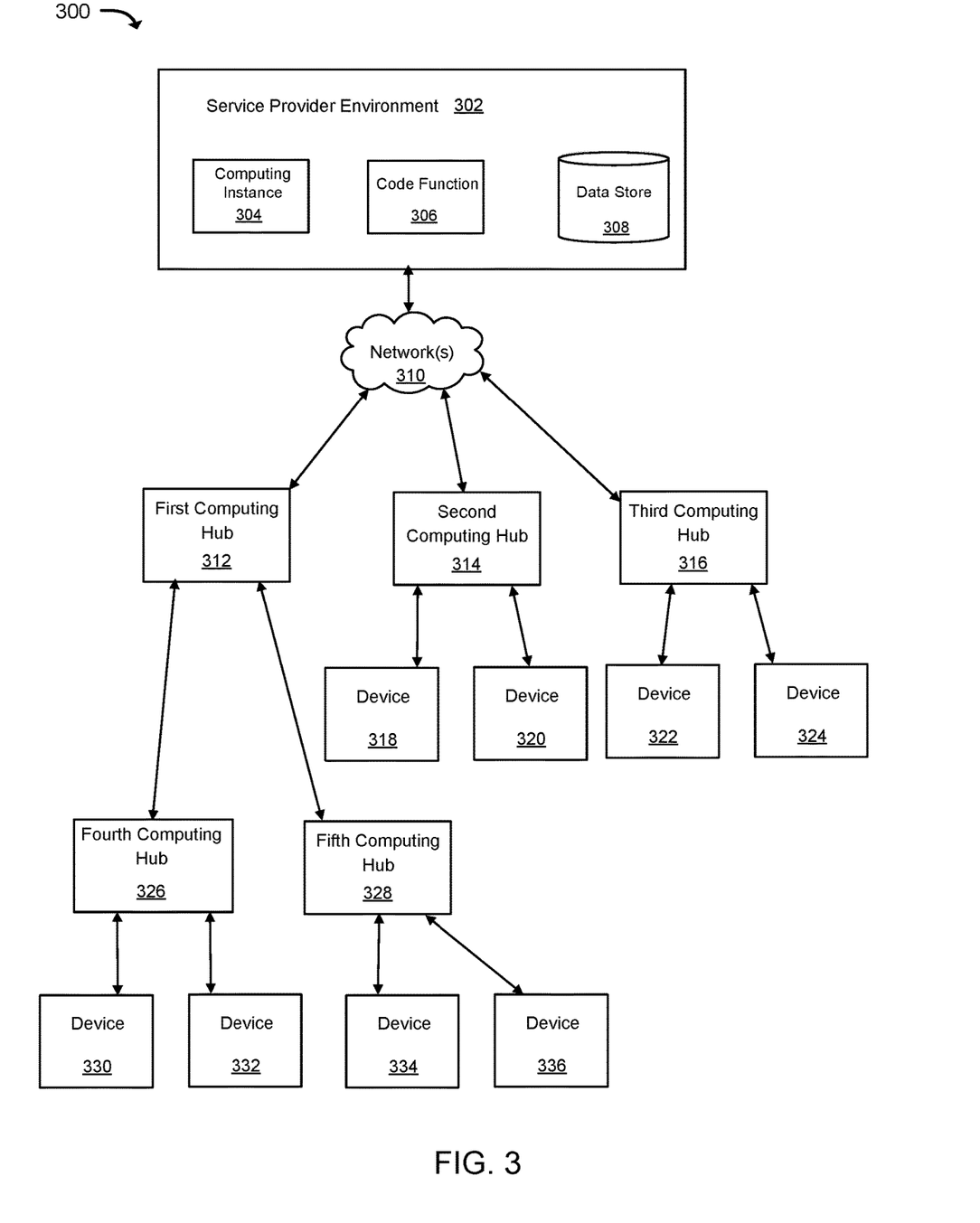
FIG. 3 is a block diagram illustrating a plurality of computing hubs connected to one another and a service provider environment according to example embodiments of the present technology.

FIG. 3 illustrates an environment 300 that includes a service provider environment 202 and a plurality of computing hubs with devices. It should be appreciated that the service provider environment 302, computing instance 304, code function 306, data store 308, network 310, first computing hub 312, second computing hub 314, third computing hub 316, fourth computing hub 326, and fifth computing hub 328 and devices 318, 320, 322, 324, 330, 332, 334, and 336 may have the features and capabilities of the computing hub 102, the data store 104, the device 112, and the device 114 respectively of FIG. 1 and the service provider environment 202, the computing instance 204, the code function 208, the data store 206, the network 214, the computing hub 216, the device 230, and the device 232 respectively of FIG. 2.

The environment 300 depicts a plurality of computing hubs connected to the network 310. The first computing hub 312, the second computing hub 314, the third computing hub 316, the fourth computing hub 326, and the fifth computing hub 328 may each have the similar features to one another. The first computing hub 312 may be in communication with second computing hub 314, and a second computing hub 314 may be in communication with the third computing hub 316. The computing hubs may be in communication with one another to share information. For example, the second computing hub 314 may generate a definition schema for the device 318. The definition schema may represent information learned or determined regarding the device 318. The learned information in the definition schema may be shared with another computing hub such as the third computing hub 316. This sharing of definition schemas may be particularly useful where a first device 318 is mobile and may be managed by the third computing hub 316 if the first device 318 is moved into a group of devices associated with the third computing hub 316. This sharing of definition schemas may also be useful if the third computing hub 316 is managing a device with similar capabilities or features as device 318. The second computing hub 314 may employ the definition schema to discover configuration analysis about the device 318 and relations of the device 318 to other devices (e.g. device 320) associated in a group. The configuration analysis may be shared between two computing hubs such as the second computing hub 314 and the third computing hub 316. For example, the configuration analysis may be learning what types of devices are compatible with a given device for load balancing or what applications are available to a given type of device. The computing hubs that are sharing the configuration analysis may be owned by a common entity.

The environment 300 depicts the first computing hub 312 as managing the fourth computing hub 326 and the fifth computing hub 328. The fourth computing hub 326 and the fifth computing hub 328 each manage a group of devices. The fourth computing hub 326 may generate a definition schema for the device 330 which is then shared with the first computing hub 312. This may be described as a hierarchical management of computing devices. Such management may be useful for managing large fleets of devices and computing hubs. The hierarchical management may also allow faster sharing of definition schemas as compared to sharing without the hierarchical management.

In one aspect, a definition schema may be generated for a computing hub. For example, the definition schema may be generated for the fourth computing hub 326. The first computing hub 312 may query the fourth computing hub 326 capabilities data regarding the capabilities of the fourth computing hub 326. The capabilities data from the fourth computing hub 326 may be used by the first computing hub 312 to generate a definition schema for the fourth computing hub 326. The first computing hub 312 may send the definition schema for the fourth computing hub 326 to other computing hubs such as the fifth computing hub 328 or the second computing hub 314. The definition schema for a fourth computing hub 326 may be used to discover applications available to the fourth computing hub 326. The definition schema for a computing hub may also be used to discover load balancing options between two computing hubs. For example, the definition schema for the fourth computing hub 326 may be used to discover that the fourth computing hub 326 and the fifth computing hub 328 have intersecting capabilities and this information is used to share a load between the fourth computing hub 326 and the fifth computing hub 328.

Figure 4:
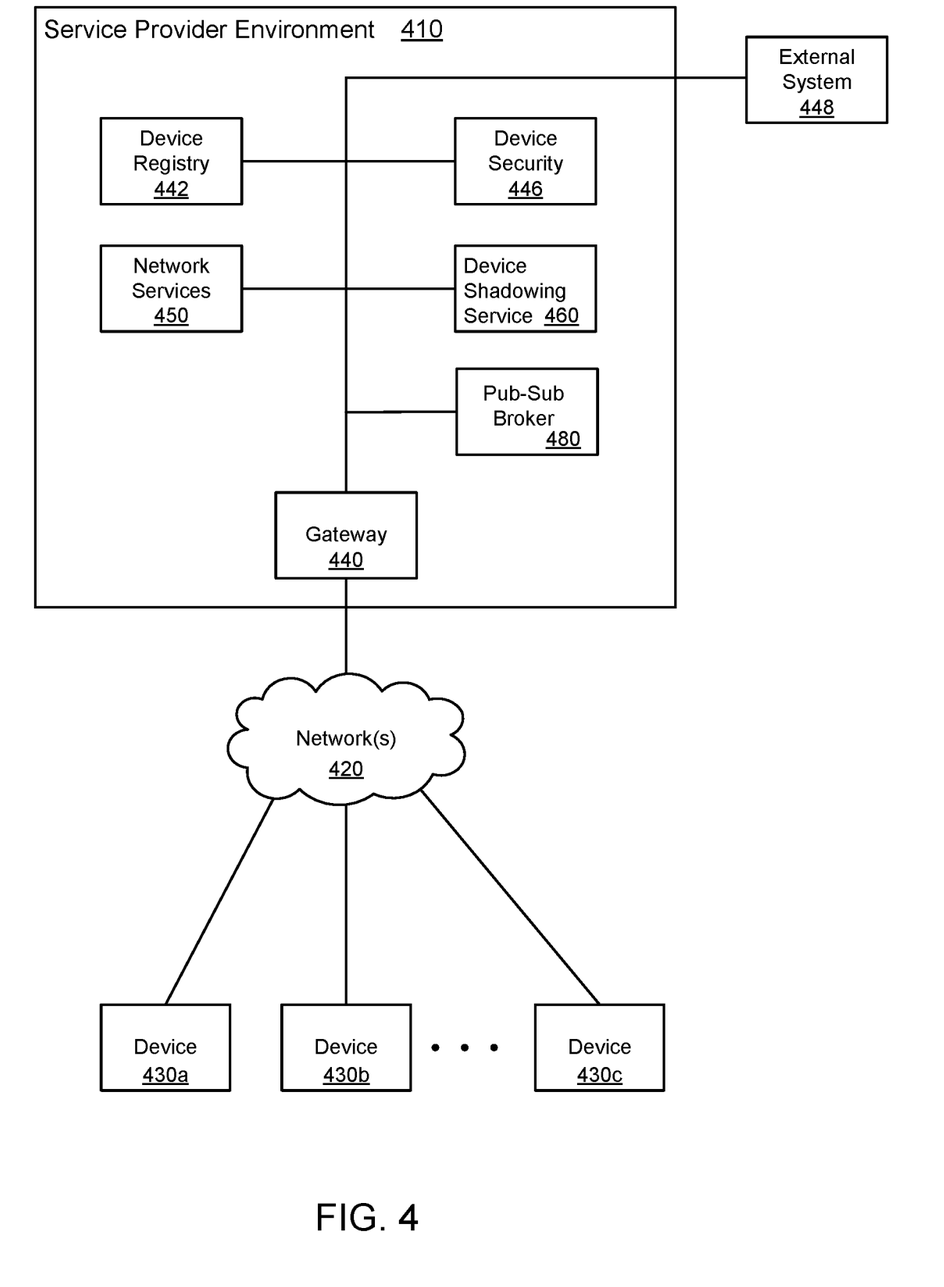
FIG. 4 is a block diagram of an example computer networking architecture for providing devices access to network services in a service provider environment according to an example of the present technology.

FIG. 4 is a block diagram illustrating an example service provider environment 410 with which the clients that may be devices 430a-c may communicate. For example, a client or device may be a mobile device, a tablet, a laptop, or another hardware device with an application on the device. Particularly, the environment of FIG. 4 may be useful for clients and devices, which were described earlier. The clients or devices may be able to use the services illustrated in FIG. 4 to generate and/or exchange definition schemas. The service provider environment 410 may include a device communication environment or device support system that comprises various resources made accessible to the devices 430a-c that access the gateway server 440 via a network 420. The devices 430a-c may communicate with the service provider environment 410 in order to access services such as a device shadowing service 460, data storage, and computing processing. Services operating in the service provider environment 410 may communicate data and messages to the devices 430a-c in response to requests from the devices 430a-c and/or in response to computing operations within the services.

The service provider environment 410 may comprise communicatively coupled component systems 440, 442, 446, 450, 460 and 480 that operate to provide services to the devices 430a-c. The gateway server 440 may be configured to provide an interface between the devices 430a-c and the service provider environment 410. The gateway server 440 may receive requests from the devices 430a-c and may forward corresponding data and messages to the appropriate systems within the service provider environment 410. Likewise, when systems within the service provider environment 410 may attempt to communicate data instructions to the devices 430a-c, the gateway server 440 routes those requests to the correct device 430a.

The gateway server 440 may be adapted to communicate with varied devices 430a-c using various different computing and communication capabilities. For example, the gateway server 440 may be adapted to communicate using either TCP (Transmission Control Protocol) or UDP (User Datagram Protocol) protocols. Likewise, the gateway server 440 may be programmed to receive and communicate with the devices 430a-c using any suitable protocol including, for example, MQTT, CoAP, HTTP, and HTTPS. The gateway server 440 may be programmed to convert the data and instructions or messages received from the devices 430a-c into a format that may be used by other server systems in the service provider environment 410. In one example, the gateway server 440 may be adapted to convert a message received using the HTTPS protocol into a JSON formatted message that is suitable for communication to other servers within the service provider environment 410.

The gateway server 440 may store, or may control the storing, of information regarding the devices 430a-c that have formed a connection to the particular gateway server 440 and for which the particular gateway server 440 may be generally relied upon for communications with the device 430a. In one example, the gateway server 440 may have stored thereon information specifying the particular device 430a such as a device identifier. For each connection established from the particular device 430a, the gateway server 440 may also maintain information identifying the connection. For example, a connection identifier may be generated and stored for each connection established with a particular device 430a. Information relating to the particular connection may also be stored. For example, information identifying the particular socket of the gateway server 440 on which the connection was established, as well as information identifying the particular protocol used by the device 430a on the connection may be stored by the gateway server 440. Information such as the socket and protocol may be used in order to facilitate further communications via the particular connection.

In one example, the gateway server 440 may communicate via any suitable networking technology with a device registry server 442. The device registry server 442 may be adapted to track the attributes and capabilities of each device 430a. In an example, the device registry server 442 may be provisioned with information specifying the attributes of the devices 430a-c. The device registry server 442 may comprise data specifying rules or logic (e.g., automation rules) for handling various requests that may be received from the devices 430a-c. The device registry server 442 may be programmed to convert specialized device functions or commands received in particular communication protocols such as, for example HTTPS, MQTT, CoAP, into functions or commands using particular protocols that are understood by other of the servers in the service provider environment 410. In one example, the device registry server 442 may be provisioned with information specifying that upon receipt of a particular request from a particular device 430a, a request should be made to process and/or store the payload data of the request in a particular network service server 450. The device registry server 442 may be similarly programmed to receive requests from servers 442, 450 and convert those requests into commands and protocols understood by the devices 430a-c.

A customer may also be able to create a delivery group or group of devices in the device registry 442. These delivery groups may be retrieved by the delivery service from the device registry 442 as part of creating a deployment. In this case, a delivery group need not be defined with the data deployment but may be referred to using a delivery group defined in the device registry.

The device shadowing service server 460 may maintain state information for each connected device 430a. In an example embodiment, the device shadowing service server 460 maintains information specifying a plurality of states for each device 430a that has connected to the environment 410. In an example scenario, the device shadowing service server 460 may comprise a recorded state and a desired state. The recorded state represents the existing state of the particular devices 430a-c as presently known to the device shadowing service server 460. The device shadowing service server 460 may be configured to manage multi-step device state transitions. The device shadowing service server 460 communicates with the device gateway 440 in order to communicate requests to update a status to a particular device 430a. For example, the device shadowing server 460 may communicate a sequence of state transition commands to the device gateway 440 that update the status of a device 430a. The device gateway 440 may, in response, communicate the appropriate commands formatted for the particular device.

The device security server 446 maintains security-related information for the devices 430a-c that connect to the service provider environment 410. In one example, the device security server 446 may be programmed to process requests to register devices with the service provider environment 410. For example, entities such as device manufacturers, may forward requests to register devices 430a-c within the service provider environment 410. The device security server 446 receives registration requests and assigns unique device identifiers to devices 430a-c which use the device identifiers on subsequent requests to access the service provider environment 410. The device security server 446 stores, for each registered device, authentication information that may be provided during the device registration process. For example, a request to register a device 430a may comprise information identifying the device 430a such as a device serial number and information for use in authenticating the device 430a. In one example, the information may comprise a digital certificate and may comprise a public key of a public key-private key pair. The information may be stored in relation to the assigned device identifier for the particular device 430a. When the device 430a subsequently attempts to access the service provider environment 410, the request may be routed to the device security server 446 for evaluation. The device security server 446 determines whether authentication information provided in the request is consistent with the authentication information stored in relation to the device identifier and provided during the registration process.

The device security server 446 may be further programmed to process request to associate particular entities (individuals or organizations) with particular devices 430a-c. The device security server 446 may be adapted to receive requests to register entities, which may be, for example, individuals, users, accounts, and/or organizations, as authorized to control or communicate with a particular device 430a. In one example, a request may be received from an individual or organization that may have purchased a device 430a from a manufacturer. For example, the device may be a dishwasher, thermostat, or lighting assembly that an individual or organization purchased from the manufacturer. The individual or organization may initiate a request to register the device 430a with the individual or an organization with which the organization is associated. The request may be routed to a web services server which may be in service provider environment 410 or which communicates the request to the service provider environment 410. The request identifies the device 430*a* and the particular entity (individual or organization) that is requesting to be associated with the device 430*a*. In one example, the request may comprise a unique device identifier that was assigned when the device 430*a* was registered with the system. The request further may comprise information uniquely identifying the entity that is registering as having authority to communicate with and/or control the particular device 430*a*.

The device security server 446 stores the information identifying the particular entity in relation with the device identifier. When the particular entity subsequently attempts to control or communicate data to the particular device 430*a*, the device security server 446 may use the information to confirm that the particular entity is authorized to communicate with or control the particular device 430*a*. When an entity that has not been registered as being authorized to communicate with the device 430*a* attempts to communicate with or control the device 430*a*, the device security server 446 may use the information stored in the device security server 446 to deny the request.

A network services server 450 may be any resource or processing server that may be used by any of servers 440, 442, 446, 460 or 480 in processing requests from the devices 430*a-c*. In one example, network services server 450 may provide data storage and retrieval services and/or on-demand processing capacity. In an example scenario, the network services server 450 may be any of numerous network accessible services including, for example, web or cloud-based services. In one example, the network services server 450 may be programmed to provide particular processing for particular devices 430*a-c* and/or groups of devices 430*a-c*. For example, a network services server 450 may be provisioned with software that coordinates the operation of a particular set of devices 430*a-c* that control a particular manufacturing operation.

Servers 440, 442, 446, 450, 460 and 480 may be communicatively coupled via any suitable networking hardware and software. For example, the servers may communicate via a local area network or wide area network or a virtualized overlay network in the service provider environment 410.

An external system 448 may access the service provider environment 410 for any number of purposes. In one example, an external system 448 may be a system adapted to forward requests to register devices 430*a-c* with the service provider environment 410. For example, an external system 448 may include a server operated by or for a device manufacturer that sends requests to the service provider environment 410, and device security 446 in particular, to register devices 430*a-c* for operation with the service provider environment 410. Similarly, the external system 448 may be a system operated to provide a gateway for entities (individuals or organizations) to register an ownership or control relationship with a particular device 430*a*.

The devices 430*a-c* may be any devices that may be communicatively coupled via a network 420 with the service provider environment 410. For example, the devices 430*a-c* may be computing devices such as smart phones and tablet computers, automobiles, appliances such as washers and driers, industrial sensors, switches, control systems, etc. In one example, each of devices 430*a-c* may communicate over the network 420 to store data reflecting the operations of the particular device 430*a* and/or to request processing provided by, for example, a network services server 450. While FIG. 4 depicts three devices 430*a-c*, it will be appreciated that any number of devices 430*a-c* may access the service provider environment 410 via the gateway server 440. Further it will be appreciated that the devices 430*a-c* may employ various different communication protocols. For example, some devices 430*a-c* may transport data using TCP, while others may communicate data using UDP. Some devices 430*a-c* may use MQTT, while others may use CoAP, and still others may use HTTPs. It will also be appreciated that each of the devices 430*a-c* may be programmed to send and receive particular functions or commands in requests that are not compatible with other devices or even the systems within service provider environment 410. The gateway server 440 may be programmed to receive and, if needed, attend to converting such requests for processing with the service provider environment 410.

Figure 5:
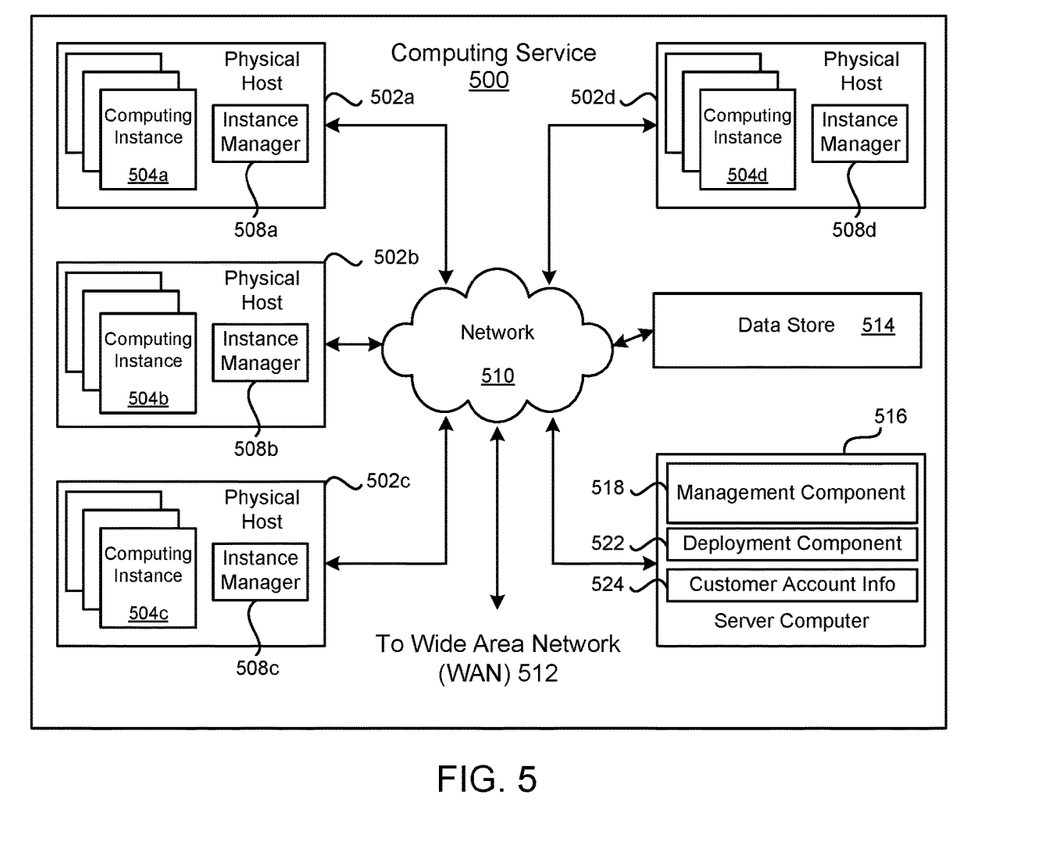
FIG. 5 is a block diagram that illustrates an example computing service environment according to an example of the present technology.

FIG. 5 is a block diagram illustrating an example computing service 500 or service provider environment that may be used to execute and manage a number of computing instances 504*a-d* upon which the present technology may execute. In particular, the computing service 500 depicted illustrates one environment in which the technology described herein may be used. The computing service 500 may be one type of environment that includes various virtualized service resources that may be used, for instance, to host computing instances 504*a-d*. The computing service 500 may be in communication with a computing hub such as the computing hub 102 of FIG. 1.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked clients, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502*a-d*. The server computers 502*a-d* may also be known as physical hosts. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine manager (VMM), or another type of program configured to enable the execution of multiple computing instances 504a-d on a single server. Additionally, each of the computing instances 504a-d may be configured to execute one or more applications.

A data store 514 may be the same as the data store 206 of FIG. 2. The data store 514 may store a plurality of definition schemas for devices. The definition schemas may be accessed by a computing hub or other service via the data store 514.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache is to be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multitenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. In addition, the network 510 may include a virtual network overlaid on the physical network to provide communications between the servers 502a-d. The network topology illustrated in FIG. 5 has been simplified, as many more networks and networking devices may be utilized to interconnect the various computing systems disclosed herein.

Figure 6:
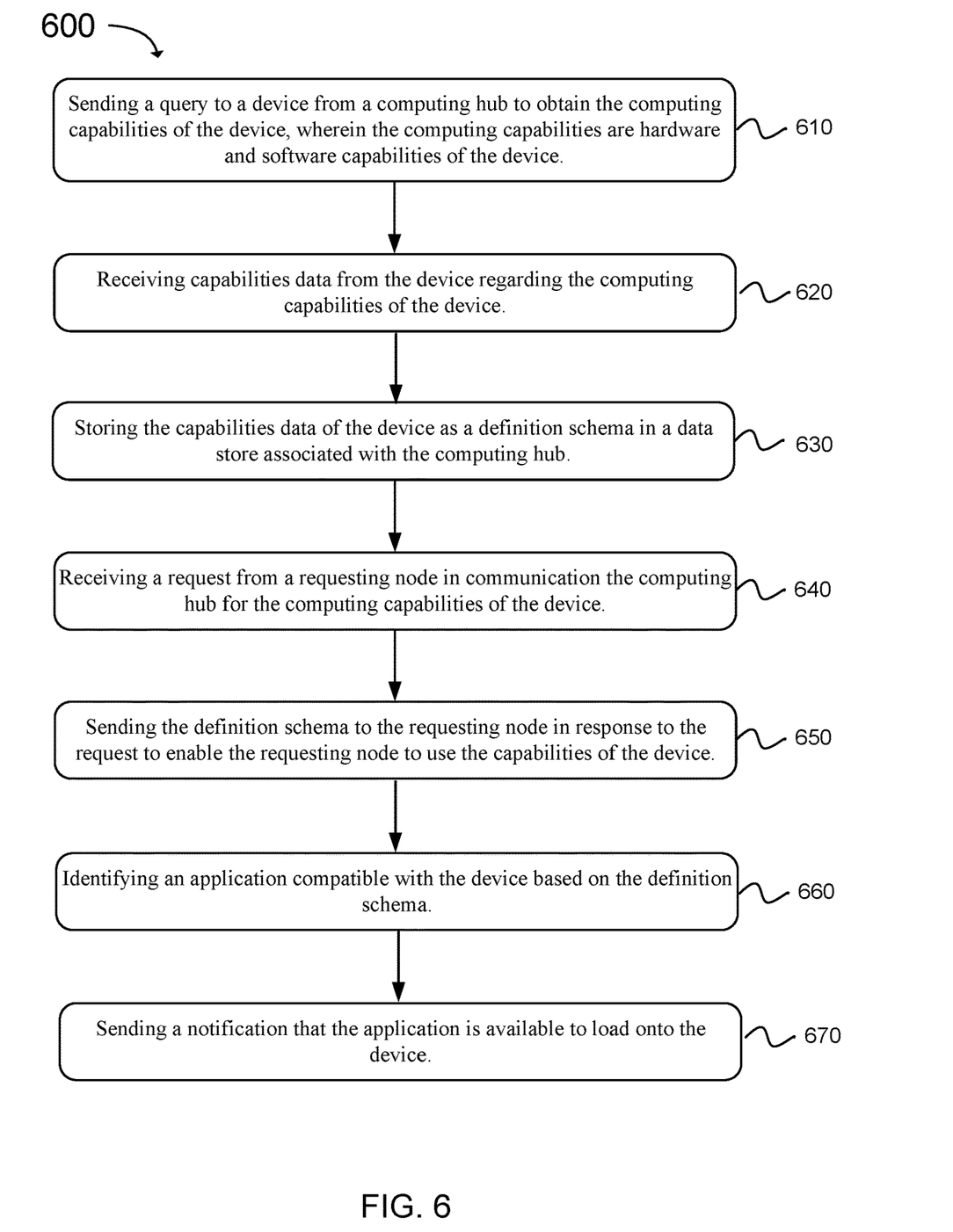
FIGS. 6-7 are flowcharts illustrating example methods for identifying capabilities of a device according to an example of the present technology.

FIG. 6 is a flowchart of an example method 600 for identifying computing capabilities of a device according to an example of the present technology. The functionality 600 may be implemented as a method and executed as instructions on a machine, where the instructions are included on at least one computer readable medium or one non-transitory machine-readable storage medium. For example, starting in block 610, a query may be sent to a device from a computing hub to obtain the computing capabilities of the device, wherein the computing capabilities are hardware and software capabilities of the device. The query may also be sent to the device by a computing instance in a service provider environment. The query may include a script that may cause the device to generate the requested capabilities data when executed by the device.

Capabilities data may be received from the device regarding the computing capabilities of the device, as in block 620. In one aspect, the capabilities data may be hardware capabilities, software capabilities, services available from the device, or the computing architecture of the device.

The capabilities data of the device may be stored as a definition schema in a data store associated with the computing hub, as in block 630. A request may be received from a requesting device in communication with the computing hub for the computing capabilities of the device, as in block 640. The device may be a peer of the device or a management type of device.

The definition schema may be sent to the requesting device in response to the request to enable the requesting device to use the capabilities of the device, as in block 650. The requesting device may use the definition schema to discover the capabilities of the device.

An application compatible with the device may be identified based on the definition schema, as in block 660. The application may be configured to make use of the capabilities of the device. The application may allow the device to use capabilities data from other devices associated with the device. For example, two devices may be in the same group associated with geographic location, such as a smart home. A first device may be a display and have a definition schema generated regarding the capabilities of the first device. The second device may be a camera and the application identified as available to the first device based on the definition schema may be an application that allows the display of the first device to display images based on the data captured by the camera of the second device. The application may be identified by the computing hub or by a service or computing instance executing in a service provider environment. A notification that the application is available to load onto the device may be sent, as in block 670. The notification may be sent to a user or a user account associated with the device. The application may then be installed on the device upon approval of a user or approval via a user account.

The definition schema may be used by the computing hub or other device or service to identify capabilities of the device that are in common with a second device. The second device may be processing a computing load. The device may be used to load balance or share the load being processed by the second device based on the capabilities that the two devices have in common.

Figure 7:
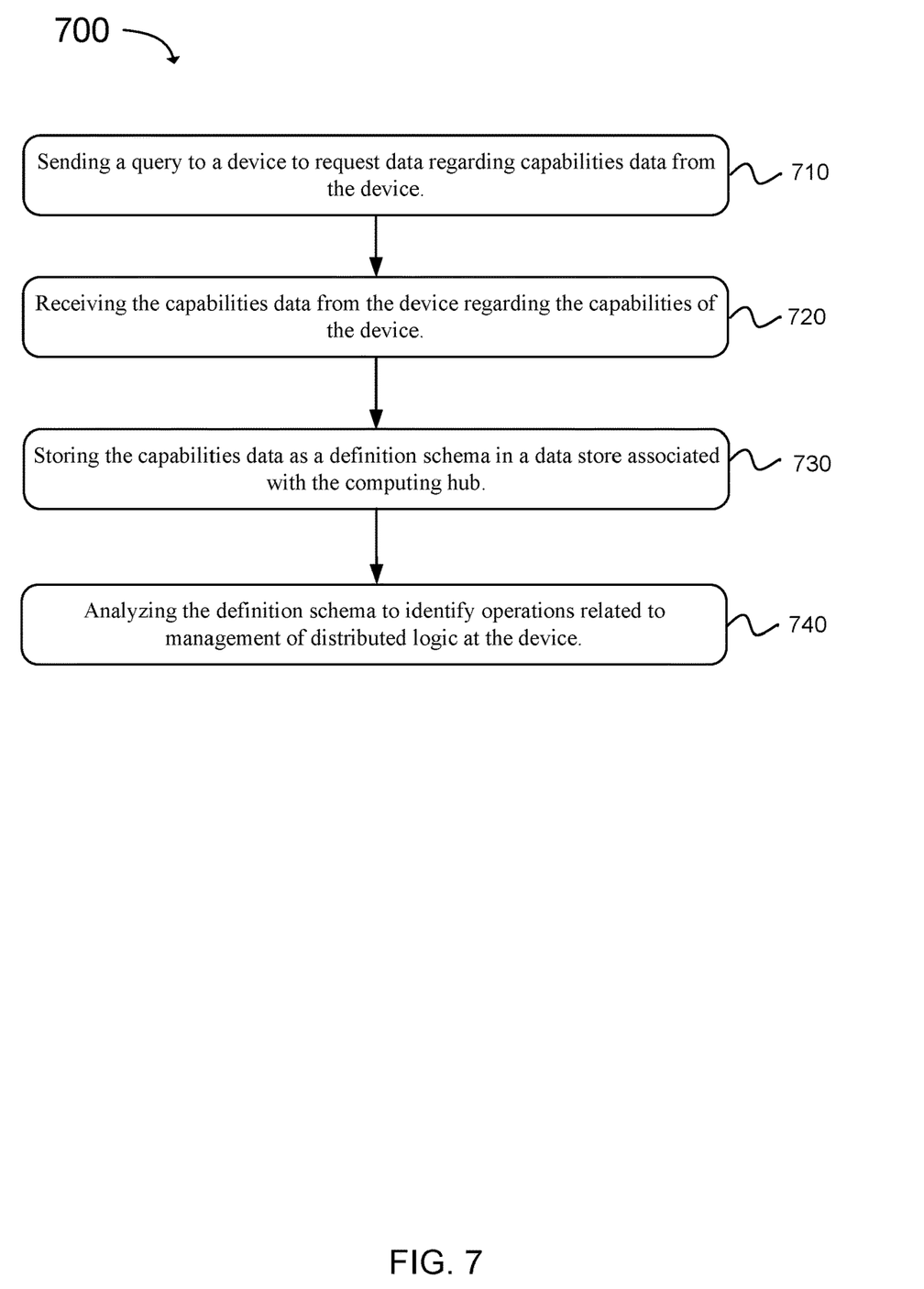

FIG. 7 is a flowchart of an example method 700 to identify computing capabilities of a device according to an example of the present technology. The functionality 700 may be implemented as a method and executed as instructions on a machine, where the instructions are included on at least one computer readable medium or one non-transitory machine-readable storage medium. For example, starting in block 710, a query may be sent to a device to request capabilities data regarding capabilities of the device. The device may have limited capabilities and may be an IoT device. Limited capabilities may refer to the resources of the device. For example, the IoT device may have an embedded processor that is slower or less capable than the processor of a desktop computing system. In aspect the device with limited capabilities has a microcontroller unit (MCU). The capabilities may refer to hardware capabilities, software capabilities, services available from the device, or the computing architecture of the device. The query may be sent by a computing hub that manages the device in a group of devices. Alternatively, the query may be sent by a computing instance or service executing in a service provider environment. For example, the query may send a script to the device. The device may execute the script to generate the requested capabilities data. The script may be configured such that the device outputs the capabilities data in JSON format. Alternatively, the capabilities data may be output in bitmap format, as described earlier.

The capabilities data may be received from the device regarding the capabilities of the device, as in block 720. The capabilities data may be stored or burned in the device by the manufacturer of the device. The device may send a unique identifier in response to the query that may be used to look up the capabilities of the device from the manufacturer or other third party. The capabilities data may be stored as a definition schema in a data store, as in block 730. The data store may be associated with the computing hub or the service provider environment. The definition schema may be stored in any format. In one aspect, the definition schema is stored in a format that is consumable by the device and other devices associated with the device such as JSON or bitmap format.

The definition schema may be sent to a second data store associated with a service provider environment. The definition schema may be accessed by devices or services associated with the service provider environment to discover the capabilities of the device. A request may be received from a requesting device in communication with the computing hub for the capabilities of the device. The requesting device may be a device in a group with the device. The definition schema may be sent to the requesting device in response to the request to enable the requesting device to use the capabilities of the device.

The definition schema may be analyzed to identify operations related to the management of distributed logic at the device, as in block 740. The distributed logic may be software that is available to the device but not yet installed on the device. Alternatively, the distributed logic may be updated or deleted from the device based on the definition schema. For example, the definition schema may indicate a version number of software or firmware installed on the device. A computing hub or component of a service provider environment may use the definition schema to discover that the device is using an old version of the software or firmware and then manage the device by sending an updated version to the device. In one aspect, the distributed logic is employed for load balancing between the device and at least one other device.

In one aspect, the definition schema may be employed to identify an application available to the device. A notification may be sent to a user or user account associated with the device indicating that the application is available to the device.

In one aspect, the definition schema may be employed to identify capabilities of the device that are in common with a second device. The second device may be processing a computing load, and the device may be used to load balance or share the load being processed by the second device using on the capabilities that the two devices have in common.

In one aspect, the definition schema is employed to determine a list of devices that are authorized to access the device. A computing hub may then manage access to the device based on the list of devices. An authorized device may be authorized to only access a portion of the features or capabilities of the device.

Figure 8:
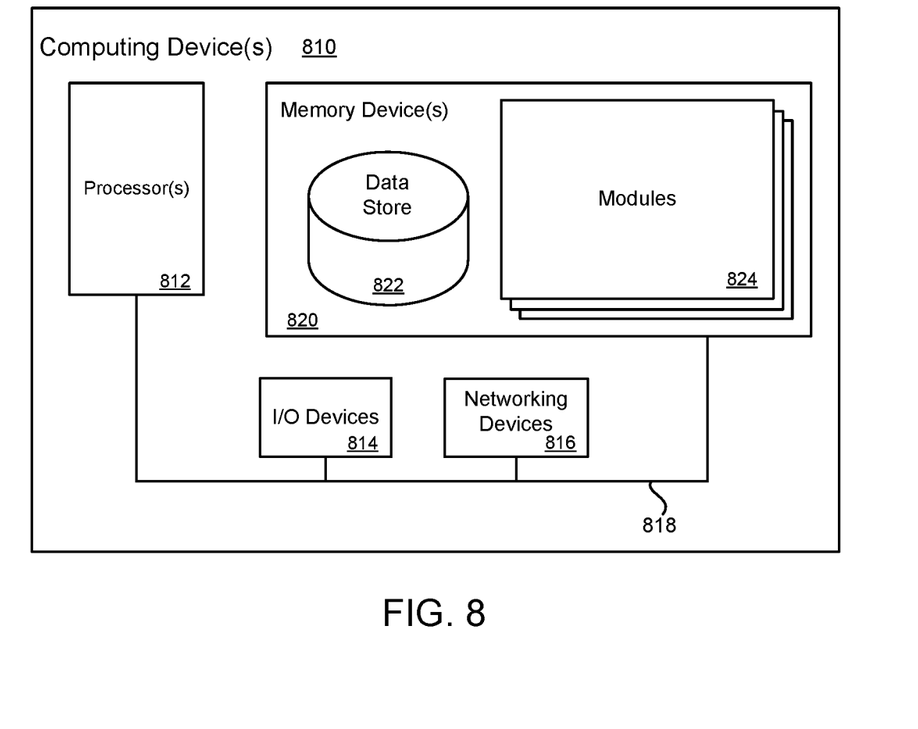
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules that are executable by the processor(s) 812 and data for the modules. Located in the memory device 820 are modules 824 executable by the processor. The modules may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed cause a processor to identify device computing capabilities, comprising:
sending a query to a first device from a computing hub to obtain the computing capabilities of the first device, wherein the computing capabilities are hardware and software capabilities of the first device wherein the computing hub manages the first device and is deployed on a network with the first device;
receiving capabilities data from the first device regarding the computing capabilities of the first device;
storing the capabilities data from the first device as a definition schema in a data store associated with the computing hub;
identifying a first application compatible with the first device based on the definition schema, wherein operations of the first application are coordinated with operations of a second application on a second device deployed on the network with the first device;

sending a notification to another device that the first application is available to load onto the first device;

identifying, using the definition schema, that the first device has capabilities in common with the second device that is executing a processing load; and balancing the processing load between the first device and the second device.

2. The non-transitory machine readable storage medium of claim 1, wherein the definition schema is formatted in JSON format, extensible markup language (XML) format, a comma delimited format, a flat file, or another pre-defined format.

3. The non-transitory machine readable storage medium of claim 1, wherein the query comprises a script and the first device executes the script to generate the capabilities data.

4. The non-transitory machine readable storage medium of claim 1, wherein the computing capabilities are hardware capabilities, software capabilities, services available from the first device, or a computing architecture of the first device.

5. A method, comprising:

sending a query from a computing hub to a first device to request capabilities data regarding capabilities of the first device wherein the computing hub manages the first device and is deployed on a network with the first device;

receiving the capabilities data from the first device regarding the capabilities of the first device;

storing the capabilities data as a definition schema in a data store; and analyzing the definition schema to identify operations related to management of distributed logic at the first device, wherein the operations of the distributed logic on the first device coordinate operations of a first application for the first device with operations of a second application on a second device deployed on the network with the first device.

6. The method of claim 5, wherein managing the distributed logic at the first device further comprises:

identifying the first application as compatible with the first device based on the definition schema; and sending a notification that the first application is available for use by the first device.

7. The method of claim 5, further comprising:

identifying, using the definition schema, that the first device has capabilities in common with the second device that is executing a processing load; and balancing the processing load between the first device and the second device.

8. The method of claim 5, wherein sending a query further sends a script to the first device to execute.

9. The method of claim 8, wherein the script is configured such that the first device outputs the capabilities data in JavaScript Object Notation (JSON) format.

10. The method of claim 5, wherein the definition schema is exchanged between devices and/or computing hubs to enable discovery of the capabilities of the first device.

11. The method of claim 5, wherein the capabilities of the first device are hardware capabilities, software capabilities, services available from the first device, or a computing architecture of the first device.

12. The method of claim 5, wherein the first device is an Internet of Things (IoT) device with a microcontroller unit (MCU).

13. The method of claim 5, further comprising:

employing the definition schema to determine a list of authorized devices allowed to access the first device; and managing access to the first device based on the list of authorized devices.

14. The method of claim 5, further comprising:

using the definition schema to determine applications available to the first device and services the first device is able to perform; and sharing the definition schema of the first device with a second computing hub.

15. The method of claim 5, wherein the capabilities data from the first device includes a unique identifier and the computing hub employs the unique identifier to look up the capabilities for the first device in a data store associated with a manufacturer of the first device.

16. The method of claim 5, wherein the capabilities data for the first device is permanently recorded in the first device by a manufacturer of the first device.

17. The method of claim 5, wherein the first device is associated with a group of devices and the definition schema is shared with the group of devices.

18. A system for identifying capabilities of a device, comprising: a computing hub comprising:

a processor; and a memory device including instructions to be executed by the processor to: send a query to a first device from the computing hub to request capabilities data regarding capabilities of the first device;

receive the capabilities data from the first device regarding the capabilities of the first device;

store the capabilities data as a definition schema in a data store associated with the computing hub;

send the definition schema to a second data store associated with a service provider environment;

identify, using the definition schema, that the device has capabilities in common with a second device that is executing a processing load; and balance the processing load between the first device and the second device.

19. The system of claim 18, wherein the instructions:

identify an application compatible with the first device based on the definition schema; and send a notification that the application is available for loading on the first device.

20. The system of claim 18, wherein the instructions:

receive a request from a requesting device in communication with the computing hub for the capabilities of the first device; and send the definition schema to the requesting device in response to the request to enable the requesting device to use the capabilities of the first device.

* * * * *